3,158,582
NOVEL POLYMERS OF HYDRAZINE AND DI-
ORTHOESTERS OF TEREPHTHALIC ACID
Seymour J. Lapporte, Berkeley, Calif., assignor to California Research Corporation, San Francisco, Calif., a corporation of Delaware
No Drawing. Filed Jan. 13, 1961, Ser. No. 82,377
3 Claims. (Cl. 260—2)

This invention relates to novel solid polymers prepared by the reaction of hydrazine and a hexaalkyl diorthoester of terephthalic acid. These polymers are useful as construction materials because of their hard, brittle structure and may be easily pulverized to be used as fillers and grease thickeners.

The polymers of this invention have a softening point above about 250° C. and a repeating unit with a postulated structural formula which was corroborated by analysis to be as follows:

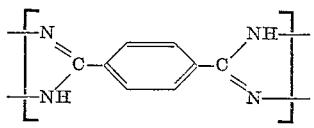

These polymers are prepared by the reaction of a hexaalkyl diorthoester of terephthalic acid and hydrazine at polymerization temperatures.

The diorthoester component of these polymers is prepared by reacting an alkali metal alkoxide at reflux temperature with any $\alpha,\alpha,\alpha,\alpha',\alpha',\alpha'$-hexahaloparaxylene. The alkoxide may be any lower alkoxide, e.g., methyl, ethyl, propyl, butyl, etc. Where the reaction is too slow or incomplete at reflux under atmospheric pressure, the reflux temperature may be increased by operating under pressure. The reaction mixture is then refluxed for a sufficient period of time to obtain a desired conversion to the hexaalkyl diorthoester. Suitable reaction times are from an hour up to several days or longer, depending on the particular reactants used and the degree of conversion desired.

If desired, the alkali metal alkoxide may be prepared in situ by dissolving the alkali metal itself in the dry alcohol corresponding to the desired alkoxide. Also, if desired, excess alcohol may be employed to serve as solvent. When the reaction is essentially complete, the resultant slurry is filtered and washed in an alcohol which may be the alcohol corresponding to the alkyl radicals of the hexaalkyl diorthoester. Excess alcohol is then distilled from the filtrate and the residue admixed with water and extracted with chloroform or other suitable solvent. The solvent phase is dried with any conventional drying agent, such as potassium carbonate, and the solvent removed. The residue obtained is purified hexaalkyl orthoterephthalate.

To form the polymer of this invention, the hexaalkyl (methyl) orthoterephthalate as prepared above is reacted at polymerization temperatures, e.g., 125 to 300° C., preferably 150 to 200° C., with hydrazine in a molar ratio hydrazine to diester of about 2:1 to 10:1 or higher, preferably about 3:1 to 10:1. Alkanol (methanol) is given off and a polymer is obtained, which is then purified by washing and drying according to methods well known in the art. Reaction is continued until the theoretical amount of alkanol methanol is evolved. In practice, about ½ to 2 hours are required.

By way of illustration, the following example is presented. However, it must be remembered that this example is included merely to further describe the process and product of this invention and is not to be construed as putting additional limitations upon the scope thereof.

*Example*

A solution of sodium methoxide and methanol was prepared by dissolving 75 g. of metallic sodium in 1200 ml. of dry methanol. To this mixture was added 157 g. of $\alpha,\alpha,\alpha,\alpha',\alpha',\alpha'$-hexachloroparaxylene, and the mixture was refluxed for about six days. At the end of this time, the mixture was further heated to about 200° C. under pressure of 600 p.s.i.g. for five hours. The resultant slurry was then filtered and the filter cake washed with methanol. The methanol was distilled from the filtrate, the residue poured into 1.5 liters of water, and then extracted with chloroform. The chloroform extracts were dried over potassium carbonate, after which the solvent was removed. After crystallization from mixed hexanes, a product was obtained melting at 124.8 to 125.5° C. Recrystallization from mixed hexanes gave a product melting at 124.4 to 125° C. which was analyzed to be hexamethyl orthoterephthalate. (Found: C, 58.91; H, 7.83—Theory: C, 58.72; H, 7.75.)

5.73 g. of the above hexamethyl orthoterephthalate were mixed with 6.4 g. hydrazine and heated to about 150° C., when a reaction occurred as evidenced by the evolution of methanol. After 92 percent of the methanol was recovered overhead, the hot residue was removed, washed with water and ethanol, and dried. A solid brown polymer was obtained having a softening point of about 260–265° C. accompanied by evolution of gas. This polymer was insoluble in ethanol, water, acetic acid, chloroform, and benzene. It was slightly soluble in dimethyl sulfoxide and dimethyl formamide, and soluble to an appreciable extent in concentrated sulfuric acid.

The analysis of this polymer was as follows:

|  | Theory | Found |
|---|---|---|
| Carbon | 60.74 | 62.60 |
| Hydrogen | 3.82 | 4.63 |
| Nitrogen | 35.43 | 26.83 |

0.1251 g. of the above polymer was dissolved in 25 ml. of 96 percent sulfuric acid. The reduced viscosity of this solution was found to be 0.21 at 37.7° C. Reprecipitation of the polymer from the solution was effected by pouring the solution onto 300 g. of ice. The precipitate was then purified by centrifuging, washing with four 50 ml. portions of water and two 50 ml. portions of ethanol, and drying under vacuum. It softened at about 262–265° C. with gas evolution.

An infrared spectrum of this polymer was obtained in both a mineral oil and "Fluorolube"[1] mull. This showed —NH— absorption at 3350 cm.$^{-1}$; C=N/ absorption at 1620 cm.$^{-1}$; and aromatic para disubstitution at 855 cm.$^{-1}$. These absorptions corroborate the postulated structure of the repeating unit:

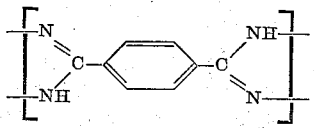

The polymer of the invention may be prepared either batchwise or continuously, and can be used alone or in admixture with similar or dissimilar polymeric materials and with or without the usual modifiers or compounding agents for polymeric materials.

As will be evident to those skilled in the art, various modifications in this process can be made or followed, in the light of the foregoing disclosure and discussion, without departing from the spirit or scope of the disclosure or from the scope of the claims.

[1] Trade name of Hooker Electrochemical Corporation.

I claim:
1. A hard brittle polymer having a softening point in excess of 250° C. prepared by reacting hydrazine at polymerization temperature in the range of about 125° to 300° C. with a hexalkyldiorthoester of terephthalic acid, with the evolution of alkanol, wherein the mole ratio of hydrazine to diorthoester is in the range of about 2:1 to 10:1.
2. A polymer prepared by the method according to claim 1, wherein said hexa-alkyldiorthoester is hexamethyldiorthoester.
3. Hexamethylorthoterephthalate.

References Cited in the file of this patent
UNITED STATES PATENTS

| | | |
|---|---|---|
| 2,411,142 | Kelso et al. | Nov. 18, 1946 |
| 2,884,383 | Grundmann et al. | Apr. 28, 1959 |
| 2,884,462 | Henry | Apr. 28, 1959 |
| 2,912,390 | Jaruzelski | Nov. 10, 1959 |
| 2,979,533 | Bruson et al. | Apr. 11, 1961 |

OTHER REFERENCES

Chemistry of Aliphatic Ortho Esters—Post, A.C.S. Monograph Series, Reinhold Publishing Corp., New York, N.Y., 1943, pages 96–105.